Nov. 6, 1928.
F. W. PRESTON
1,690,908
MACHINE FOR FORMING SHINGLES
Filed March 10, 1927     5 Sheets-Sheet 1
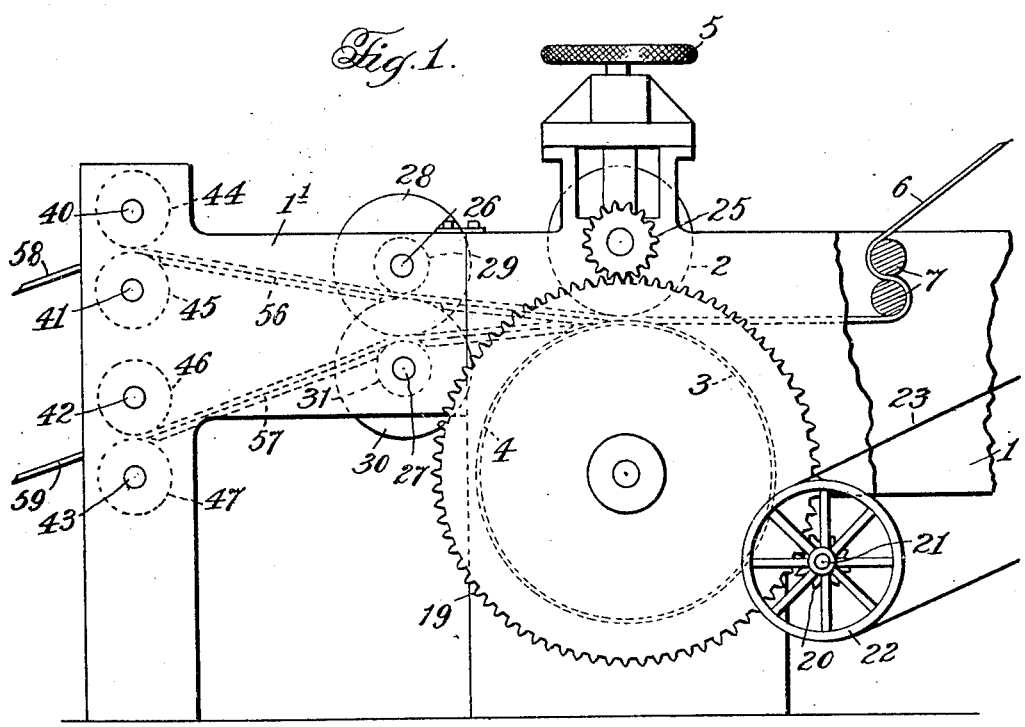
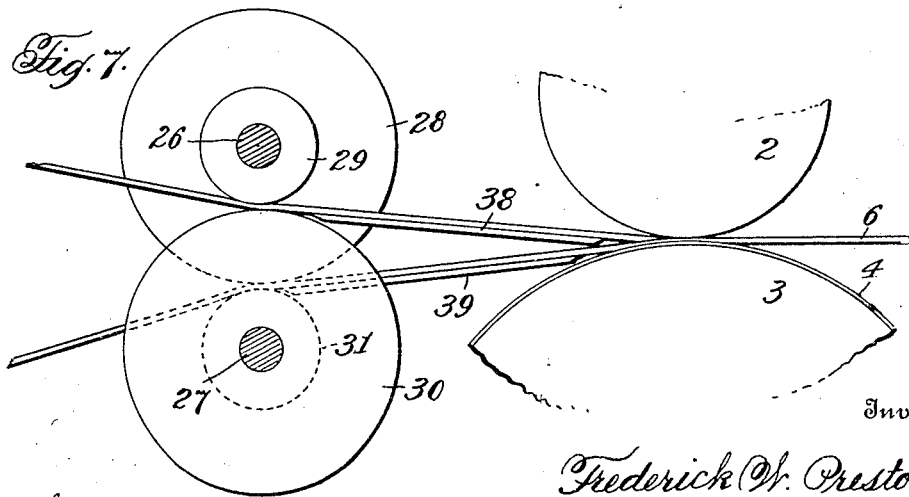

Nov. 6, 1928.  
F. W. PRESTON  
1,690,908  
MACHINE FOR FORMING SHINGLES  
Filed March 10, 1927   5 Sheets-Sheet 2
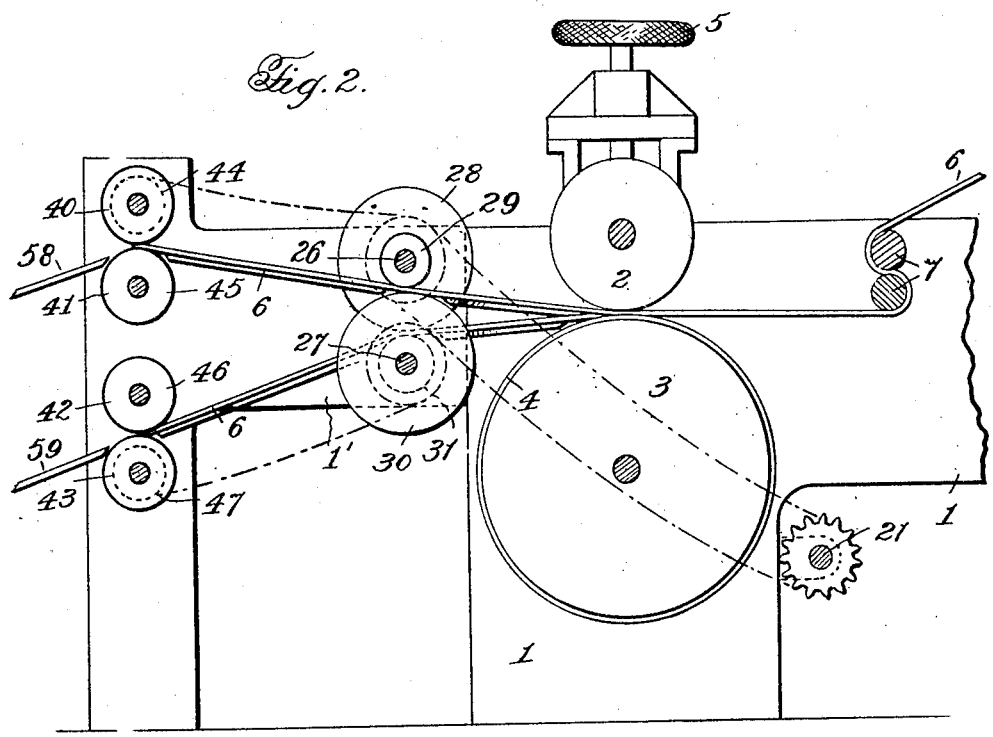
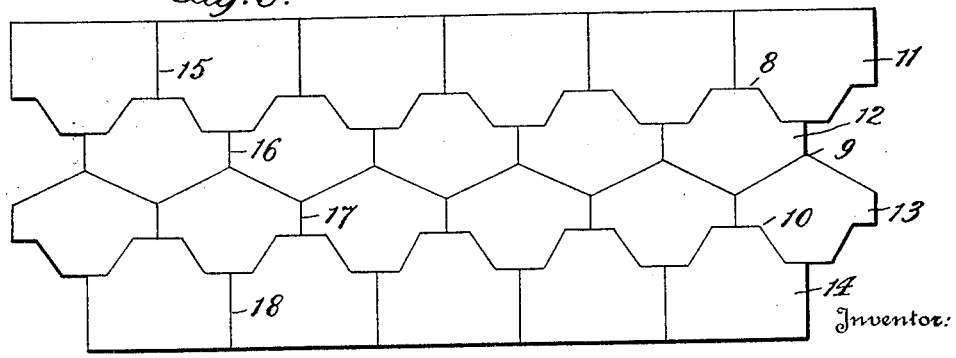

Nov. 6, 1928.  1,690,908
F. W. PRESTON
MACHINE FOR FORMING SHINGLES
Filed March 10, 1927  5 Sheets-Sheet 3
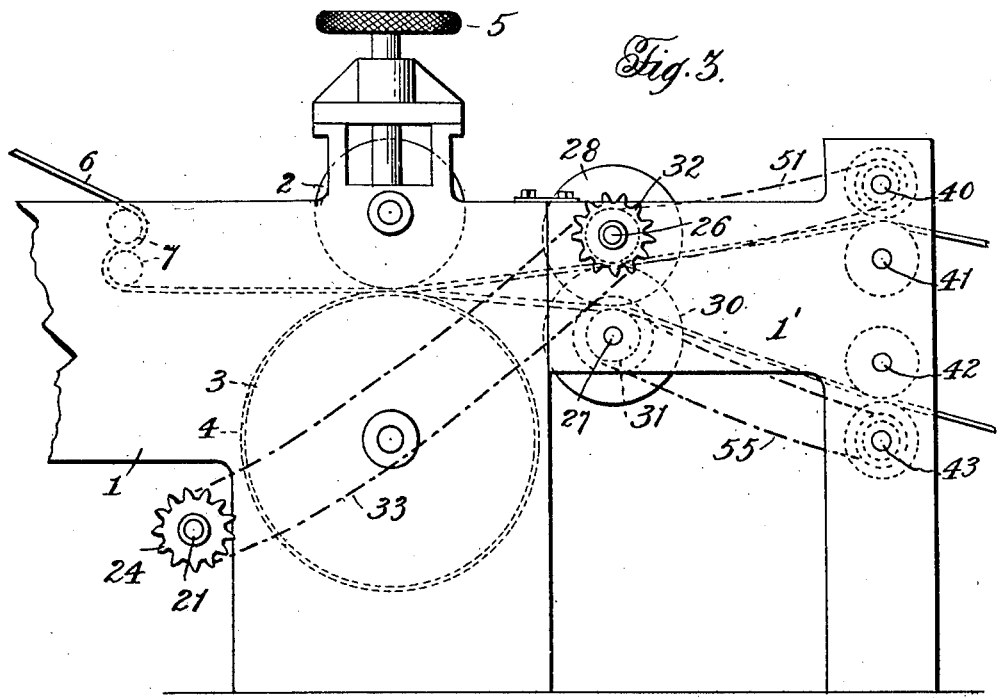
Fig. 3.
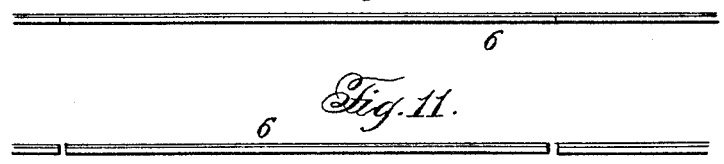
Fig. 9.
Fig. 11.
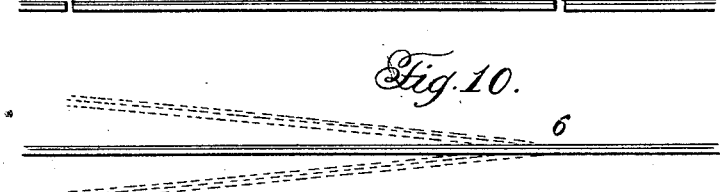
Fig. 10.
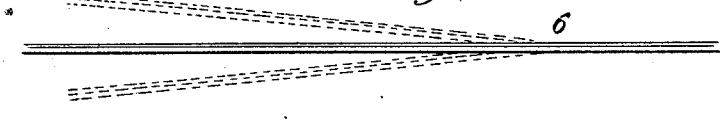
Inventor,
Frederick W. Preston,
By Milans & Milans
Attorneys
Witness:
Jas E Hutchinson

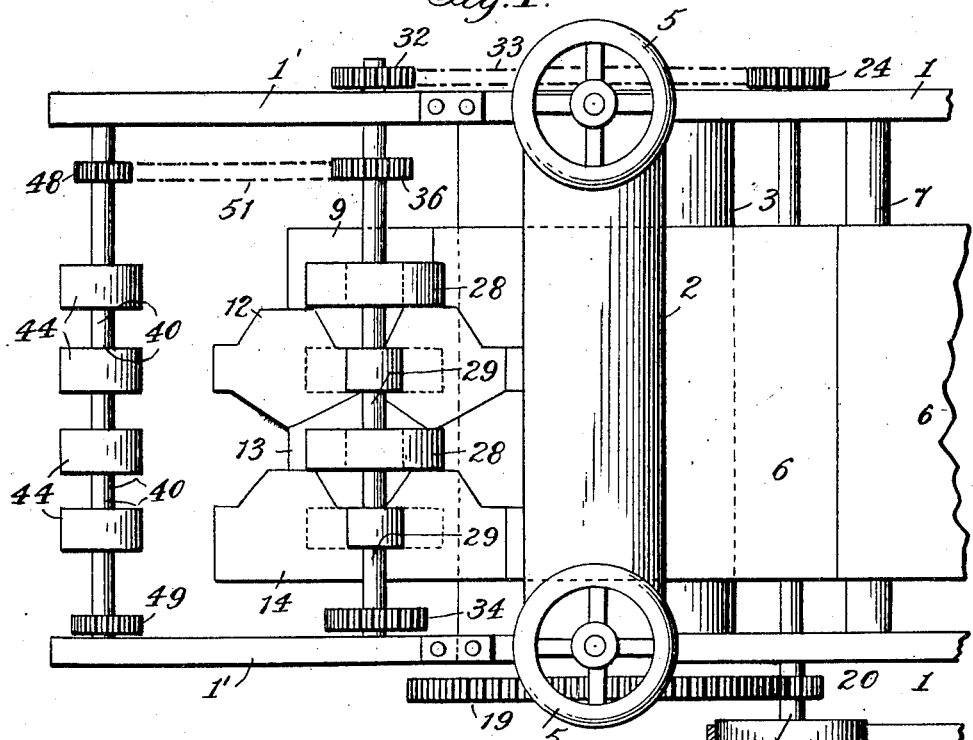
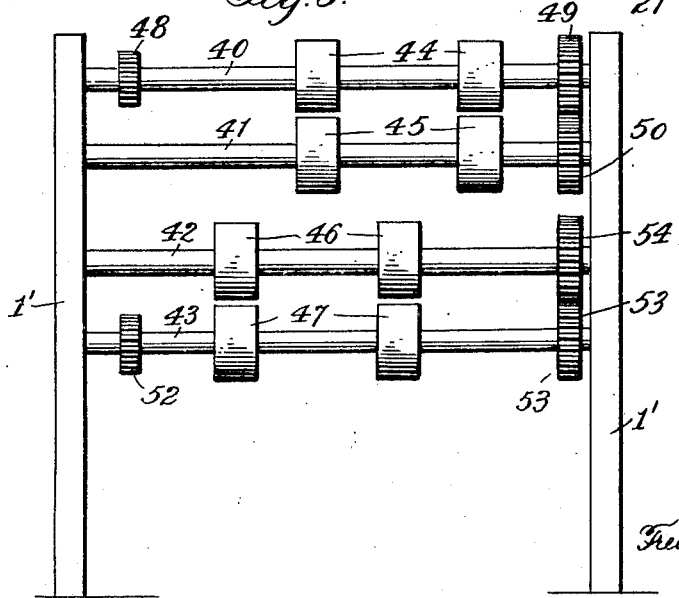

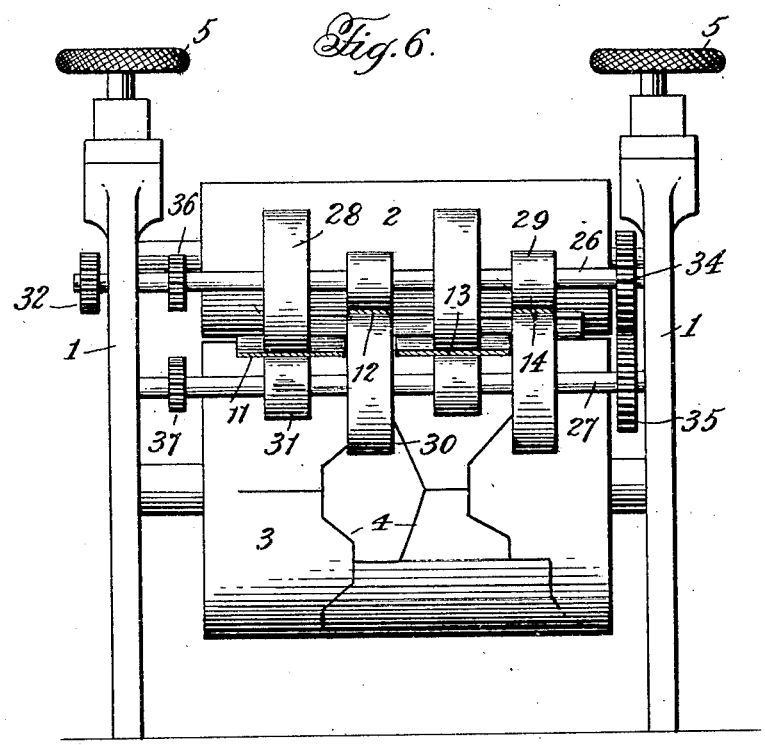
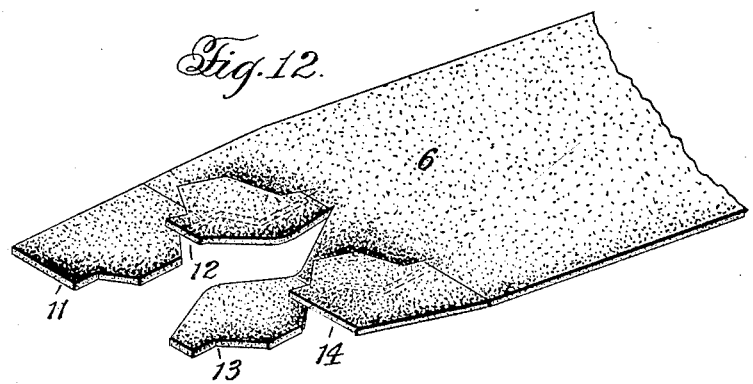

Patented Nov. 6, 1928.

1,690,908

UNITED STATES PATENT OFFICE.

FREDERICK W. PRESTON, OF YORK, PENNSYLVANIA, ASSIGNOR TO KEYSTONE ROOFING MANUFACTURING COMPANY, OF YORK, PENNSYLVANIA, A CORPORATION OF PENNSYLVANIA.

MACHINE FOR FORMING SHINGLES.

Application filed March 10, 1927. Serial No. 174,226.

My invention relates to new and useful improvements in a machine for forming shingles from a strip of material and more particularly to means for separating the shingles after the material has been cut along both longitudinal and transverse lines, it being understood that the longitudinal cuts sever the strip into a plurality of rows and that the transverse cuts divide the several rows into a plurality of shingles.

The principal object of the invention resides in the provision of means for separating the adjacent rows of shingles vertically or to position them on different vertical planes and then to separate the shingles of each row longitudinally or in other words to separate the shingles of each row on their transverse cuts and then space them longitudinally.

Another object consists in the provision of guides for directing the rows of shingles into their proper lines and to direct the separated shingles into proper channels to be received in receptacles or in stacks on shelves or the like.

With the above and other objects in view, which will appear as the description proceeds, my invention consists in the novel details of construction and arrangement of parts, described in the following specification and illustrated in the accompanying drawings, and while I have illustrated and described the preferred embodiments of the invention, as they now appear to me, it will be understood that such changes may be made as will fall within the scope of the appended claims.

In the drawings:

Fig. 1 is an elevation of one side of the machine.

Fig. 2 is a longitudinal section through the machine as shown in Fig. 1, with parts in elevation.

Fig. 3 is a view similar to Fig. 1 of the opposite side of the machine.

Fig. 4 is a top plan.

Fig. 5 is an end view.

Fig. 6 is a transverse vertical section through the machine with parts shown in elevation.

Fig. 7 is a fragmental detail, enlarged, showing the rollers for separating the rows of shingles into different vertical planes.

Fig. 8 is a top plan of the material after passing the cutting cylinder, showing the design cut.

Fig. 9 is an edge view of the material showing the transverse cuts.

Fig. 10 is an edge view of the material showing in dotted lines how the rows are positioned on different vertical planes.

Fig. 11 is an edge view of the material showing the shingles spaced longitudinally and separated on the transverse cuts, and Fig. 12 is a perspective showing a portion of the material and manner of cutting.

In the drawings 1 indicates a frame of any desired or well-known construction in which is rotatably supported the roll 2 and cutter cylinder 3, knives 4 of the shape to cut the desired design of shingle being carried by the cylinder. The roll 2 may be adjusted towards or away from the cylinder 3 by means of the hand wheels 5. The material 6 to be cut is fed through the rollers 7 and between the roll 2 and cylinder 3. The material may be of any desired composition such as is used for making the shingles known as "composition shingles" but it will be understood that different forms of material might be used. The knives 4 carried by the cylinder 3 will cut the material into the design shown quite clearly in Fig. 8 by the cuts 8, 9 and 10 longitudinally of the material to form the rows 11, 12, 13 and 14 and the series of transverse cuts 15, 16, 17 and 18 to separate the rows into shingles. Preferably the cuts, both longitudinal and transverse, will not go entirely through the material but will only go partially therethrough as shown more clearly in Fig. 9 of the drawings. This is of advantage where the surface of the strip is covered with granular particles and will prevent dulling of the knives 4.

A relatively large gear wheel 19 is secured to one end of the shaft which carries the cylinder 3 and meshes with a relatively small pinion 20, as shown more particularly in Figs. 1 and 4 of the drawings. The pinion 20 is carried adjacent one end of a shaft 21 journaled transversely of the frame 1 and a pulley 22 is also secured to the shaft 21 adjacent the pinion 20. Power, from any suitable source, is applied to the pulley 21 through the belt 23. Secured to the opposite end of the shaft 21 is a gear wheel 24 for a purpose which will be later described. The gear wheel 19 also meshes with the pinion 25 secured to the shaft which carries the cutter roll 2.

Vertically spaced shafts 26 and 27 are rotatably mounted in an auxiliary frame 1' in front of the roll 2 and cylinder 3 as shown more particularly in Figs. 1 and 3 of the drawings. Carried by the shaft 26 are the alternating relatively large and relatively small rollers 28 and 29, respectively and carried by the shaft 27 are the alternating relatively large and relatively small rollers 30 and 31, respectively, the relatively large and relatively small rollers carried by the shaft 26 being staggered with those carried by the shaft 27 so that the relatively large rollers of the shaft 26 will align with the relatively small rollers on the shaft 27 and the relatively small rollers on the shaft 26 will align with the relatively large rollers on the shaft 27. The relatively small rollers, on each of the shafts, are preferably secured thereto for rotation therewith, whereas the relatively large rollers on each of the shafts are loosely mounted.

Secured to the shaft 26, adjacent one end thereof, is a gear wheel 32 and a drive chain 33 passes around the gear 24 on the shaft 21 and the gear 32 on the shaft 26 for rotating the shaft 26. Adjacent the opposite end of the shaft 26 is secured a gear 34 which meshes with a gear 35 secured to the shaft 27 so that the shaft 27 is rotated simultaneously with the shaft 26. A gear wheel 36 is also secured to the shaft 26 and a gear wheel 37 is secured to the shaft 27 for a purpose to be later described.

Guide plates or platforms 38 and 39 are positioned between the roll 2 and cutter cylinder 3 and the rollers mounted upon the shafts 26 and 27, the plate or platform 38 being inclined upwardly and the plate or platform 39 inclined downwardly for guiding the rows of shingles in a manner and for a purpose to be presently described.

Mounted adjacent the forward end of the auxiliary frame 1', in front of the shafts 26 and 27 and the rollers supported thereby, are the vertically spaced shafts 40, 41, 42 and 43 which are adapted to be rotated. Carried by the shaft 40 are the transversely spaced rollers 44 and carried by the shaft 41 are the transversely spaced rollers 45, the rollers 44 and 45 being secured to their respective shafts for rotation therewith. Carried by the shaft 42 are the transversely spaced rollers 46 and carried by the shaft 43 are the transversely spaced rollers 47, the rollers being secured to their respective shafts for rotation therewith. As shown more particularly in Fig. 5 of the drawings there are two sets or pairs of upper rollers mounted upon the shafts 40 and 41 and two lower sets or pairs of rollers mounted upon the shafts 42 and 43, the upper sets or pairs of rollers being in staggered relation relative to the lower sets or pairs of rollers. The purpose of this will be presently brought out. Secured to the shaft 40, adjacent one end thereof, as more particularly illustrated in Fig. 5 of the drawings, is a gear wheel 48 and secured adjacent the opposite end of the shaft 40 is a gear 49 in mesh with a gear 50 carried by the shaft 41. A sprocket chain 51 surrounds the gear wheel 36 carried by the shaft 26 and the gear wheel 48 carried by the shaft 40 and imparts rotatable movement to the shaft 40 from the shaft 26. The shaft 41 is rotated by the shaft 40 through means of the intermeshing gears 49 and 50. A gear wheel 52 is secured to the shaft 43 adjacent one end thereof, and secured adjacent the opposite end of the shaft is a gear 53 which meshes with the gear 54 secured to the shaft 42. A sprocket chain 55 surrounds the gear wheel 37 carried by the shaft 27 and the gear 52 carried by the shaft 43 for rotating the shaft 43 and the shaft 42 through means of the intermeshing gears 53 and 54. The rollers carried by the shafts 40, 41, 42 and 43 will preferably be rotated at a greater speed than the rollers carried by the shafts 26 and 27 for a purpose which will be later described. Guide plates or platforms 56 and 57 are positioned as shown more particularly in Figs. 1 and 2 of the drawings for guiding the rows of shingles between the rollers carried by the shafts 26 and 27 and the pairs of rollers carried by the shafts 40 and 41 and 42 and 43 respectively and guide plates 58 and 59 are positioned forwardly of the pairs of rollers carried by the shafts 40 and 41 and 42 and 43 respectively for directing the individual shingles into suitable receptacles or into suitable stacks or piles upon shelves or the like.

Having fully described the detailed construction I will now endeavor to more clearly bring out the mode of operation. At the outset I might state that prior to my invention in forming shingles or multiple shingles from a continuous strip of roofing material considerable difficulty has been experienced in removing and separating the shingles especially when the projections of one row of shingles extend into depressions of the adjacent row.

In my machine the material 6 is fed through the rollers 7 and then between the roll 2 and cutting cylinder 3. The knives on the cutting cylinder sever the material on a number of both longitudinal and transverse lines, the longitudinal lines dividing the material into a plurality of separate rows and the transverse cuts or lines dividing the several rows into a plurality of shingles. As I have previously stated the cuts are preferably not sufficiently deep in the material to go entirely therethrough but leave the several shingles and rows partly connected. After passing through the roll 2 and cutting cylinder the material will be engaged by the rollers carried upon the shafts 26 and 27 and as the relatively large and the relatively small rollers of the shafts are in staggered relation one row of the shingles will be directed upwardly whereas the adjacent row will be directed downwardly thereby tearing or separating the rows of shingles on their longitudinal cuts. The upwardly directed and downwardly directed rows of shingles will alternate throughout the width of the material. After passing beyond the rollers carried by the shafts 26 and 27 the rows of shingles directed upwardly will be engaged by the rollers 44 and 45 carried by the shafts 40 and 41 and as these particular rollers are operated at a higher speed than the rollers carried by the shafts 26 and 27 the shingles of those rows will be separated on their transverse lines to form shingles. A jerking action will be imparted to space the particular shingle being operated on longitudinally from the next shingle. The rows of shingles being directed downwardly will be engaged by the rollers carried by the shafts 42 and 43 and will be separated in the manner, as previously described, for the shingles operated upon by the upper rollers carried by the shafts 40 and 41. From the above description it will be seen that I secure a positive separation by a tearing action along the longitudinal cuts or lines and that I secure a positive separation along the transverse cuts or lines by a grabbing or pulling action to tear along these lines. In the action set forth the several rows of shingles are initially placed on different vertical planes or the alternating rows are placed on different vertical planes and then the shingles are separated from the several rows and delivered into receptacles or stacks. The several shafts with their associated rollers will be rotated in the manner previously set forth. In the construction shown in the drawings I have illustrated the strip as being cut to provide four rows and therefore as shown more particularly in Fig. 6 of the drawings there will be four rollers positioned on each of the shafts 26 and 27. There will be two rows of shingles directed upwardly and two rows directed downwardly. Therefore I provide only two rollers on each of the shafts 40, 41, 42 and 43. I do not desire to limit myself to the exact number of rows cut from the strip for it will be understood that any desired number of rows may be cut and a suitable number of rollers provided on the several shafts for securing the proper separating or tearing action. No matter how many rows might be cut alternating rows will be directed into different vertical planes for tearing or separating on the longitudinal cuts or lines.

Where I have referred in the specification to shingles I wish it understood that this term may cover either the so-called individual shingle or strip shingle and while I have illustrated and described the use of a main frame 1 and an auxiliary frame 1' it will be understood that a single frame may be used, if desired. The separating mechanism carried by the auxiliary frame 1' may be formed as a part of a cutting machine such as is now used or may be formed as an attachment therefor. The auxiliary frame 1' may be connected to or disconnected from the main frame as desired.

Having fully described my invention what I claim as new and desire to secure by Letters Patent is:

1. In a machine for forming shingles from a strip of material, means for feeding the material through the machine, means for cutting the strip longitudinally to form separate rows and transversely to divide each row into a plurality of shingles, rollers in the path of movement of the material to position the rows in different planes, and rollers in the path of movement of the material for separating the shingles in each row on the transverse cuts.

2. In a machine for forming shingles from a strip of material, means for feeding the material through the machine, means for cutting the strip longitudinally to form separate rows and transversely to divide each row into a plurality of shingles, rollers in the path of movement of the material to position the rows in different planes, and rollers in the path of movement of the material for separating the shingles in each row on the transverse cuts, the last mentioned rollers being operated at a greater speed than the first mentioned rollers for spacing the separated shingles from the remaining material.

3. In a machine for forming shingles from a strip of material, means for feeding the material through the machine, means for cutting the strip longitudinally to form separate rows and transversely to divide each row into a plurality of shingles, vertically spaced shafts, alternating relatively large and relatively small rollers carried by each of the shafts for severing the rows on the longitudinal cuts and positioning adjacent rows in different planes, the rollers carried by one shaft being staggered relative to the rollers carried by the other shaft, and means for separating the shingles of each row on the transverse cuts.

4. In a machine for forming shingles from a strip of material, means for feeding the material through the machine, means for cutting the strip longitudinally to form separate rows and transversely to divide each row into a plurality of shingles, vertically spaced shafts, alternating relatively large and relatively small rollers carried by each of the shafts for severing the rows on the longitudinal cuts and positioning adjacent rows in different planes, the rollers carried by one shaft being staggered relative to the rollers carried by the other shaft, and rotatable pairs of rollers engageable with the shingles of separated rows for separating the shingles in each row on the transverse cuts.

5. In a machine for forming shingles from a strip of material, means for feeding the material through the machine, means for cutting the strip longitudinally to form separate rows and transversely to divide each row into a plurality of shingles, vertically spaced shafts, alternating relatively large and relatively small rollers carried by each of the shafts for severing the rows on the longitudinal cuts and positioning adjacent rows in different planes, the rollers carried by one shaft being staggered relative to the rollers carried by the other shaft, and rotatable pairs of rollers in the path of movement of the separated rows of shingles for separating the shingles in each row on the transverse cuts.

6. An attachment for a machine, wherein material is cut on longitudinal lines to form a plurality of rows and on transverse lines to divide the rows into a plurality of members, said attachment being movable as a unit relative to the machine and including means for positioning the rows in different planes, and means for separating the members in each row at the transverse cuts.

7. In combination with a machine adapted for cutting a strip of material on longitudinal lines to form a plurality of rows and on transverse lines to divide the rows into a plurality of members, of an attachment readily movable towards or away from the machine as a unit and adapted to be detachably connected thereto, said attachment including rollers for severing the rows in different planes, and rollers for separating the members in each row at the transverse cuts.

8. In combination with a machine adapted for cutting a strip of material on longitudinal lines to form a plurality of rows and on transverse lines to divide the rows into a plurality of members, of an attachment readily movable towards or away from the machine as a unit and adapted to be detachably connected thereto, said attachment including vertically spaced shafts, alternating relatively large and relatively small rollers carried by each of the shafts for severing the rows on the longitudinal cuts and positioning adjacent rows in different planes, the rollers carried by one shaft being staggered relative to the rollers carried by the other shaft, and means for separating the members of each row on the transverse cuts.

In testimony whereof I hereunto affix my signature.

FREDERICK W. PRESTON.